J. MONTGOMERY.
SUBMERGED PROPELLER.

No. 5,224. Patented Aug. 7, 1847.

UNITED STATES PATENT OFFICE.

JAMES MONTGOMERY, OF MEMPHIS, TENNESSEE.

SCREW-PROPELLER.

Specification of Letters Patent No. 5,224, dated August 7, 1847.

*To all whom it may concern:*

Be it known that I, JAMES MONTGOMERY, of Memphis, in the county of Shelby and State of Tennessee, have invented new and useful Improvements in Submerged Propellers, and that the following is a full, clear, and exact description of the principle or character which distinguishes them from all other things before known, and of the manner of making, constructing, and using the same, reference being had to the accompanying drawings, making part of this specification, in which—

Figure 1:
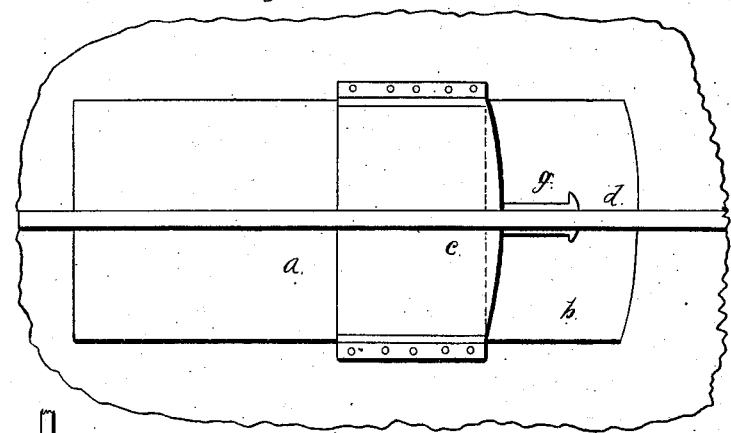
Figure 2:
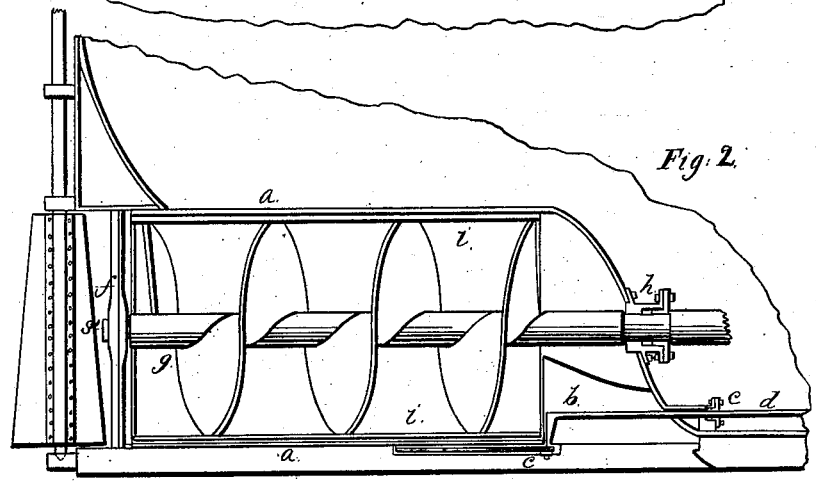
Figure 3:
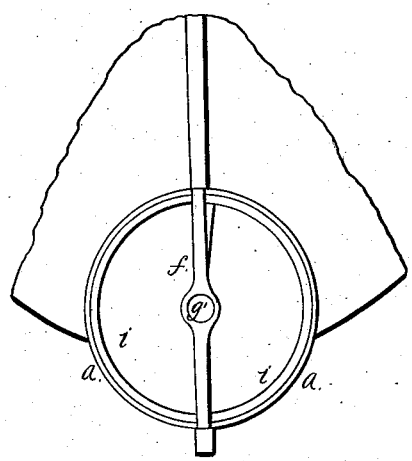

Figure 1 is a bottom plan; Fig. 2, a vertical section; and Fig. 3, an end view. The same letters indicate like parts in all the figures.

The nature of my invention consists in constructing a cylinder in the dead wood or other part of the vessel; and in placing within the cylinder so constructed a second cylinder containing a screw the edges of which are firmly secured to this second cylinder, which is thereby made to revolve with the screw, thus forming an Archimedean screw. Also, in the manner of admitting the water to the screw or propeller by an opening in the front or outer cylinder as shown in Fig. 1. This opening is closed by a sliding valve, see Figs. 1 and 2 *c, c.* The opening at the back end of the cylinder may be closed in a similar manner. The valve *c*, of the opening in front is operated within the vessel by a stem working through a stuffing box. In the rear of the outer cylinder is an upright post or stanchion (*f*) in which the journal (*g'*) of the shaft work. The other end of the shaft (*g'*) passes through a stuffing box, into the vessel where it is connected with the engine. The object of thus using an Archimedean screw being to control the centrifugal action of the water, and to exert the power of the screw in a direction longitudinal with the keel of the vessel. The object of the outer cylinder is to protect the inner cylinder or Archimedean screw from the injury which might otherwise arise to it by striking the banks of a canal or river, by grounding, by fouling of the cable, and from floating ice, driftwood, or other objects.

I locate my propeller in the dead wood of the stern of a vessel just forward of the rudder-post and above the keel, a cylindrical casing (*a*) being made in the vessel for its reception. A space (*b*) is left between the front end of the said case and the vessel for the admission of the water upward into it, (this is clearly shown in Figs. 1 and 2) and it can be closed by a water-tight sliding valve (*c*) that is opened within the vessel by a stem (*d*) working through a stuffing box (*e*). At the rear end of the case there is an upright post (*f*) in which the journals (*g'*) of the propeller shaft (*g*) works, the other end of which passes through a stuffing box (*h*) into the vessel where it is attached to the engine in any ordinary way that shall be found convenient. The wings of the propeller form an Archimedean screw of three (more or less) turns, the outer edges of the thread of the screw being attached to a cylindrical tube (*i*) by which they are surrounded and which revolves with them within the case (*a*) above named which is formed in the vessel. The screw is thus protected and strengthened by two surrounding coverings, one revolving within the other, which prevents all liability to accidents in canals, rivers, or other shallow waters. When the propeller is turned the water is made to flow in through the bottom and thence out at the stern. The outer case that is attached to the vessel can be entirely closed under the front end by the sliding valve (*c*) above described.

What I claim as my invention, and desire to secure by Letters Patent, is—

Constructing the propeller in the manner described, namely, an Archimedean screw or a screw to which an outer rim is attached to strengthen it, the whole being surrounded by an additional casing which outer case effectually protects the propeller from injury and by which a more perfect action is insured.

JAS. MONTGOMERY.

Witnesses:
S. C. DONN,
DAVID MARTIN.